United States Patent [19]

Benzing et al.

[11] Patent Number: 5,753,515

[45] Date of Patent: May 19, 1998

[54] SYRINGE PUMP APPARATUS FOR REMOTE DELIVERY OF REACTANTS

[75] Inventors: David Lawrence Benzing, Fairport; Douglas Lee Oehlbeck, Rochester; Robert Alan Zabelny, Spencerport, all of N.Y.

[73] Assignee: Eastman Kodak Company, Rochester, N.Y.

[21] Appl. No.: 674,471

[22] Filed: Jul. 2, 1996

[51] Int. Cl.⁶ .................. G01N 1/10; B01L 3/02; G05D 7/00; G03C 1/494

[52] U.S. Cl. ............... 436/180; 422/100; 422/110; 430/569; 396/626

[58] Field of Search ............... 422/236, 224, 422/100, 108, 110; 430/569; 396/626, 630; 436/180

[56] References Cited

U.S. PATENT DOCUMENTS

| | | |
|---|---|---|
| 3,319,840 | 5/1967 | Oehme et al. .................. 222/63 |
| 3,915,651 | 10/1975 | Nishi . |
| 3,999,048 | 12/1976 | Parthemore .................. 235/151.12 |
| 4,171,224 | 10/1979 | Verhille et al. ................. 96/94 R |
| 4,223,588 | 9/1980 | Simpson . |
| 4,586,546 | 5/1986 | Mezei . |
| 4,852,620 | 8/1989 | Jakubowicz et al. . |
| 4,921,133 | 5/1990 | Roeser . |
| 4,968,485 | 11/1990 | Morita . |
| 5,083,872 | 1/1992 | Farling et al. . |
| 5,096,690 | 3/1992 | Saito .................. 423/491 |
| 5,194,887 | 3/1993 | Farling et al. . |
| 5,213,772 | 5/1993 | Ichikawa et al. .............. 422/248 |
| 5,334,359 | 8/1994 | Matsutomi et al. ............ 422/225 |
| 5,360,320 | 11/1994 | Jameson et al. .............. 417/4 |

FOREIGN PATENT DOCUMENTS 1526359  9/1978  United Kingdom .

Primary Examiner—Nina Bhat
Attorney, Agent, or Firm—Paul A. Leipold

[57] ABSTRACT

The invention generally provides the apparatus for liquid delivery comprising a syringe pump for reactant delivery and a syringe pump for liquid chase material delivery.

19 Claims, 12 Drawing Sheets

SYRINGE PUMP APPARATUS FOR REMOTE DELIVERY OF REACTANTS

FIELD OF THE INVENTION

This invention relates to precision pumping. It particularly relates to the delivery of reactants for formation of silver halide emulsions.

BACKGROUND OF THE INVENTION

In the formation of silver halide grains for use in photographic elements, the reactant materials comprising a silver salt and a halide salt are brought together with agitation to form the grains. The formation of silver halide grain requires very careful control. During nucleation, the reactant materials must be added in such a manner that uniform nuclei are formed. These reactant materials must be added in accurate and precise quantities, and at accurate and precise rates in order that grains with the desired properties are formed. These grains must subsequently be grown without renucleation in order to produce uniform emulsions suitable for photographic use.

Present reactant delivery systems use recirculating pumps, typically either speed controlled gear/lobe pumps or constant speed centrifugal pumps with control valves. The flow is monitored by either a mass flow meter or volumetric flow meter, and flowrate is controlled by varying the speed and/or control valve position in response to a control algorithm which compares the measured flowrate with a setpoint. Flow is typically diverted from the recirculation mode to the reaction vessel by means of ball valves, plug valves, or other suitable valves. In such a typical system, fluid which is at rest in the piping to the reaction vessel must be accelerated when the flow is diverted from the recirculation mode to the reaction vessel.

There are several deficiencies with the present system for delivering reactants for the nucleation of silver halide grains. One disadvantage of such a system is that pressure transients are formed as valves are switched. These transients are caused by changes in the effective discharge coefficient of the valves as they turn, the momentum change as the fluid at rest is accelerated, and differences in flow resistance between the recirculation piping and the piping to the reaction vessel. These pressure changes directly affect the flowrate of the recirculating pump, and the feedback control system can't react quickly enough to maintain a precise, uniform flowrate. Another disadvantage of the present system is that timing variability exists, caused by imprecise valve switching and inherent time lags in many digitally controlled systems. As a result, the instantaneous flowrate relationship of the two reacting streams may vary considerably, and the total delivery amount will vary, especially for deliveries of short duration. Lesser concerns include the inaccuracies of flowrate measurement, the presence of pump pulsations, and the difficulties associated with flow control loop tuning.

New precipitation techniques require delivery of reactant materials to the reaction vessel during nucleation periods whose duration is less than 30 seconds, sometimes as little as 4 seconds or even less. While the disadvantages of the present reactant delivery system may be of marginal significance for nucleation periods of one minute or more in most current silver halide emulsions, these disadvantages become severe limitations as nucleation periods of 4 seconds or shorter are explored in these new precipitation techniques.

In U.S. Pat. No. 5,194,887, Farling et al discloses a system wherein syringe pumps are utilized for the delivery of the constituents of an emulsion (note column 5 and FIG. 2). In U.S. Patent No. 4,921,133, Roeser discloses a system wherein syringes are utilized for the delivery of chemical reactants. However, the above systems, and most others, are small in size and achieve accurate total delivery by injecting the precharged reactants into the reaction vessel at very close proximity.

PROBLEM TO BE SOLVED BY THE INVENTION

There is continuing need for a system for the delivery of reactants for silver halide grain formation that will generate accurate and precise delivery (both total delivery and flowrate) of reactants over a very short duration from a remote location. Further, there is a need for the system that is insensitive to pressure transients and momentum changes during reactant delivery to the reaction vessel. There is a need for a system capable of delivering a preset quantity of reactants precisely and accurately from a remote location.

SUMMARY OF THE INVENTION

An object of the invention is to overcome disadvantages of the prior system for delivering reactants for silver halide grain formation.

Another object of the invention is to provide accurate and precise chasing of the reactants remaining in the process piping between the remotely located syringe pump and the addition point(s) in the reaction vessel.

Another object of the invention is to provide better control of the emulsion precipitation process by providing accurate and precise delivery of reactants into the reaction vessel, particularly during nucleations of short duration.

These and other objects of the invention generally are accomplished by providing apparatus for liquid delivery comprising a syringe pump for reactant delivery and a syringe pump for liquid chase material delivery.

ADVANTAGEOUS EFFECT OF THE INVENTION

The invention allows the rapid, accurate, and precise delivery of reactant materials from a remote location into a reactor.

DETAILED DESCRIPTION OF THE INVENTION

Figure 1:
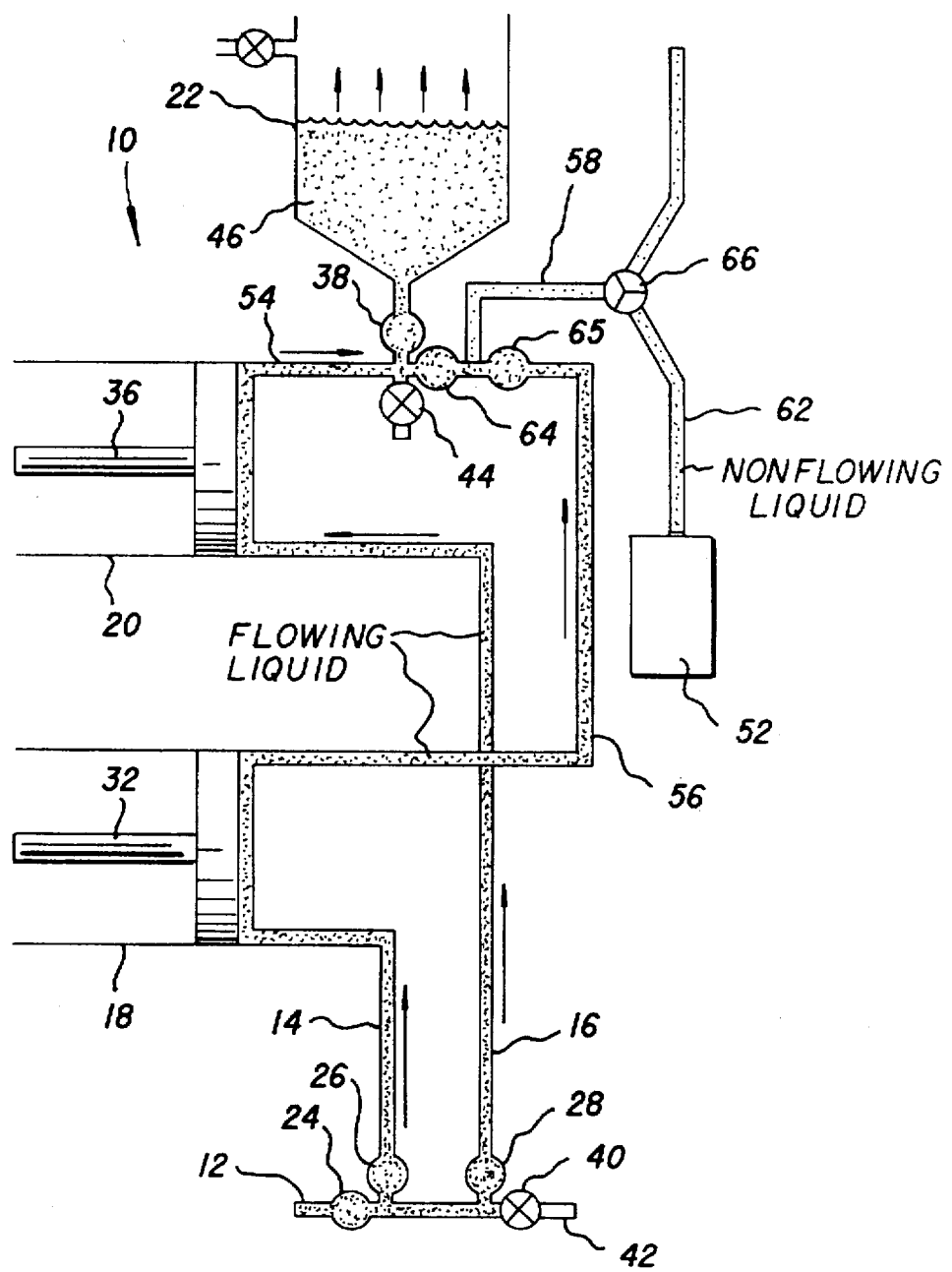
FIGS. 1-11 are schematic views of the apparatus of the invention performing a delivery cycle for reactants.

The invention has numerous advantages over the prior art. The invention allows nucleation of silver halide emulsion batches with short duration of delivery, such as four seconds or even less. The use of a water chase to follow the reactant material into the emulsion making reaction vessel ensures that the entire amount of reactant delivered by the pump is delivered into the reaction vessel. The uniform and precise delivery of the reactants to the reaction vessel for silver halide grain formation produces more uniform grains, thereby allowing more uniform photographic products. The grain morphology is more repeatable and, therefore, grain properties are more uniform. In addition to allowing short duration delivery for nucleation, the method of the invention allows uniform delivery during growth of silver halide grains, also contributing to the formation of uniform grains. The invention utilizes the water chase to ensure delivery of all reactant and allows the location of the syringe pump for the reactants to be distant from the reaction vessel where silver halide is formed. This allows more convenient location of the syringe pump cylinders, pistons, and drives for manufacturing and maintenance. The system of the invention utilizes four syringe pumps for delivering two reactive components, as two syringe pumps are required for each reactant. However, the system requires low maintenance, as each reactant syringe pump requires only one seal. The system of the invention makes practical the construction of large syringe pump systems for emulsion formation (such as 300 to 600 gallon reaction vessels) with accurate delivery using a low maintenance system. Further, the delivery is uniform and ensures that all intended reactants are delivered to the reaction vessel. These and other advantages will become apparent from the detailed description below.

In the present application, as in many manufacturing applications, equipment is large and cannot be located in close proximity to the mixing region within the reaction vessel. Considerations, such as the large volume of reactant to be delivered, the high flowrates of the delivery, and the high pressure that is developed during delivery, force the syringe cylinder/piston to be located remotely from the reaction vessel. In this application, a remote location of the syringe pump relative to the reaction vessel is defined as: the syringe pump cylinder/piston being located beyond the confines of the reaction vessel itself, and having piping connecting the syringe pump outlet to the reactant addition point(s) within the reaction vessel. The above-referenced U.S. patents for syringe delivery systems produce very accurate and precise total delivery. In contrast, the present invention makes possible both accurate and precise total delivery and accurate and precise delivery flowrate. The present invention also sets forth a system capable of operating over a wide range of flowrates, total delivery volumes, and system pressures.

This invention describes a device and the control of the operation of that device for the metering of reactants into an emulsion precipitation reactor. The unit preferably consists of two sets of two syringe pumps and their associated piping, valving, reactant supply vessels, and various monitoring and control devices. The syringe pumps consist of precision honed cylinders, each with a piston which is driven by a high precision linear actuator. Each of the reactants to be delivered to the reactor requires two syringes; one syringe pushes a reactant into a pipeline to the reaction vessel, and the second syringe follows the first, pushing water (liquid chase material) at the same volumetric flowrate as the reactant in order to push the reactant into the reaction kettle. A four axis, linear motion controller accurately controls the absolute and relative motion of all of the syringes. By using this device, a small amount of two different reactants can be delivered from a remote location very accurately and precisely.

The operation of the apparatus of the invention will become clear from the description of FIGS. 1-11. As shown in FIG. 1, the apparatus is being filled with water entering from pipe 12 where it passes into pipes 14 and 16, passing through the water syringe 18 and reactant syringe 20. The water entering from 12 then is utilized to fill vessel 22 with water. Valve 24 is then closed.

Figure 2:
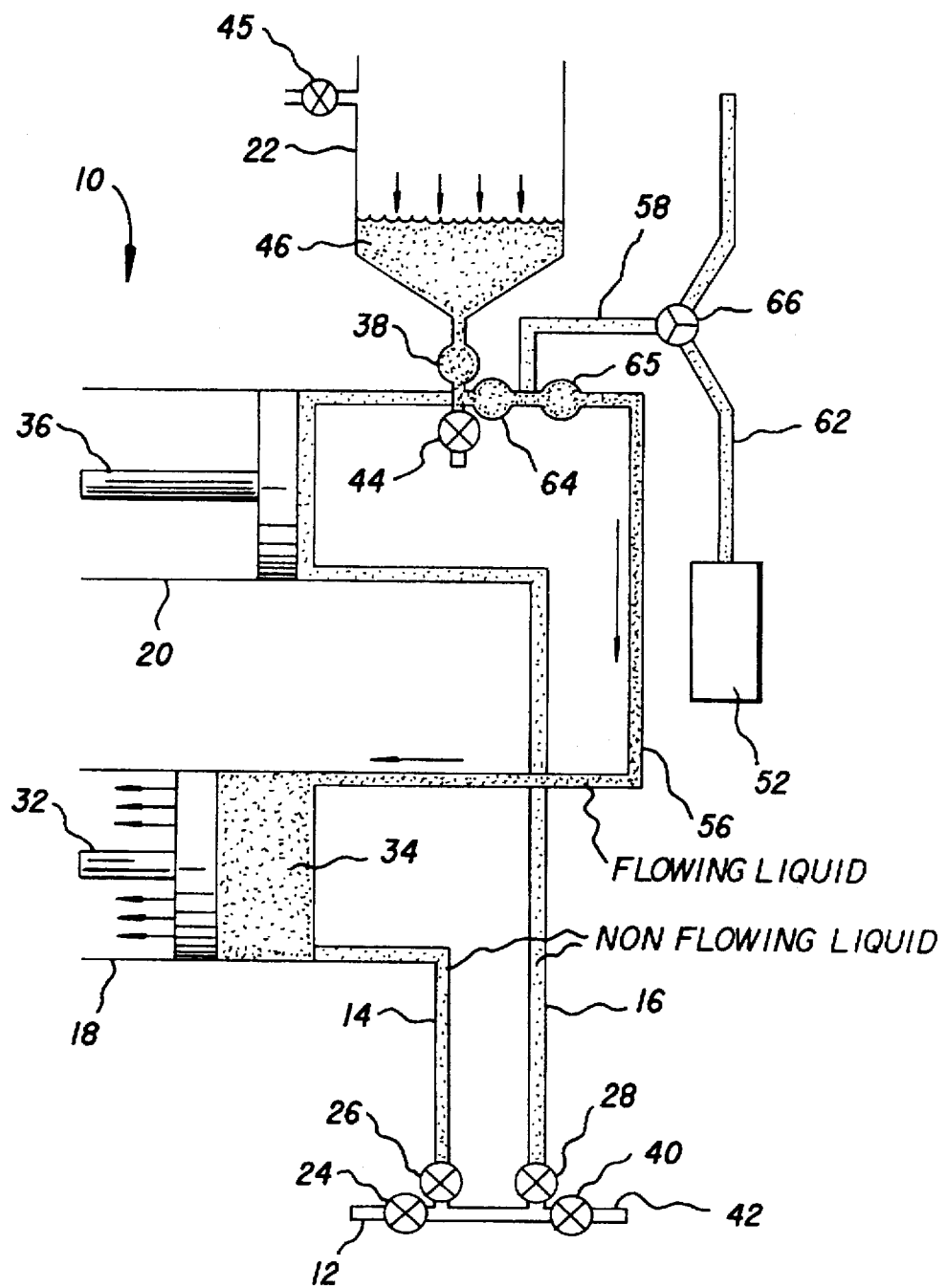

The process continues at FIG. 2 with filling of water syringe 18. With valves 26 and 28 closed, piston 32 of water syringe 18 is withdrawn to fill the water syringe 18 with water 34. The water is withdrawn from vessel 22.

Figure 3:
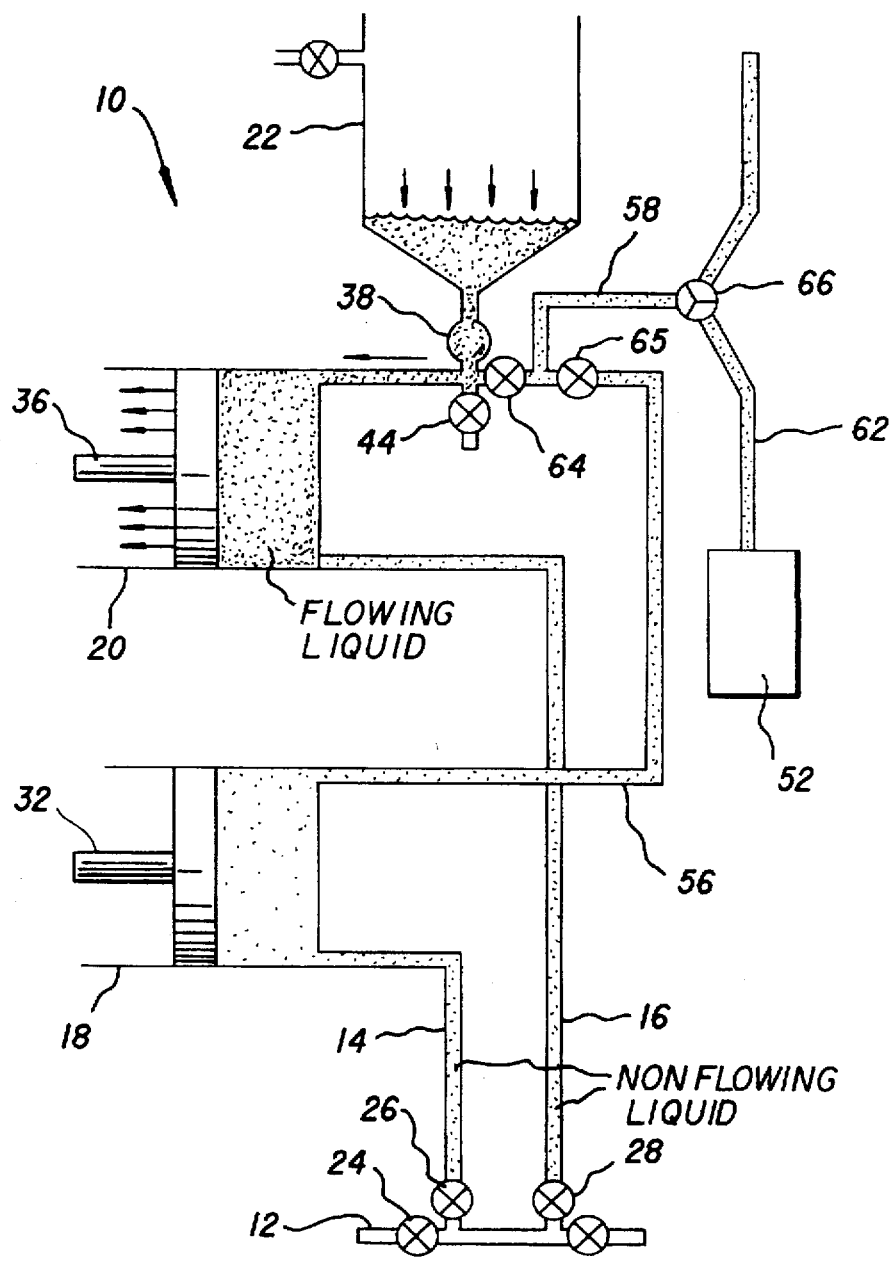
Figure 4:
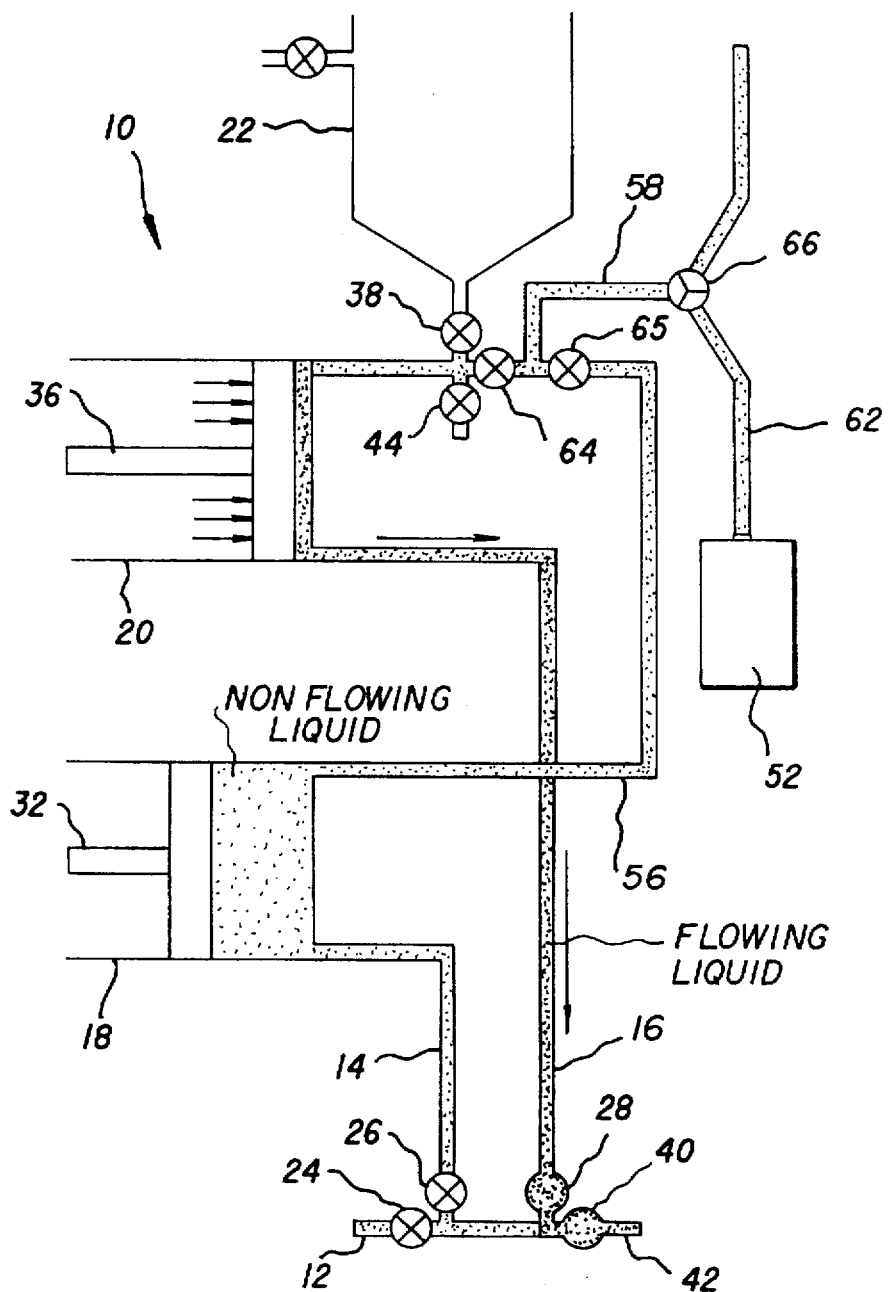

The process of apparatus use continues in FIG. 3 with extraction of excess water from vessel 22 by withdrawal of the piston 36 of reactant pump 20 to remove water from vessel 22 after which valve 38 is closed. In FIG. 4, it is shown that piston 36 is moved into the reactant syringe 20 to eject the water through valves 28 and 40 into drain line 42. Ideally, valve 28 is located in close proximity to reactant syringe 20

Figure 5:
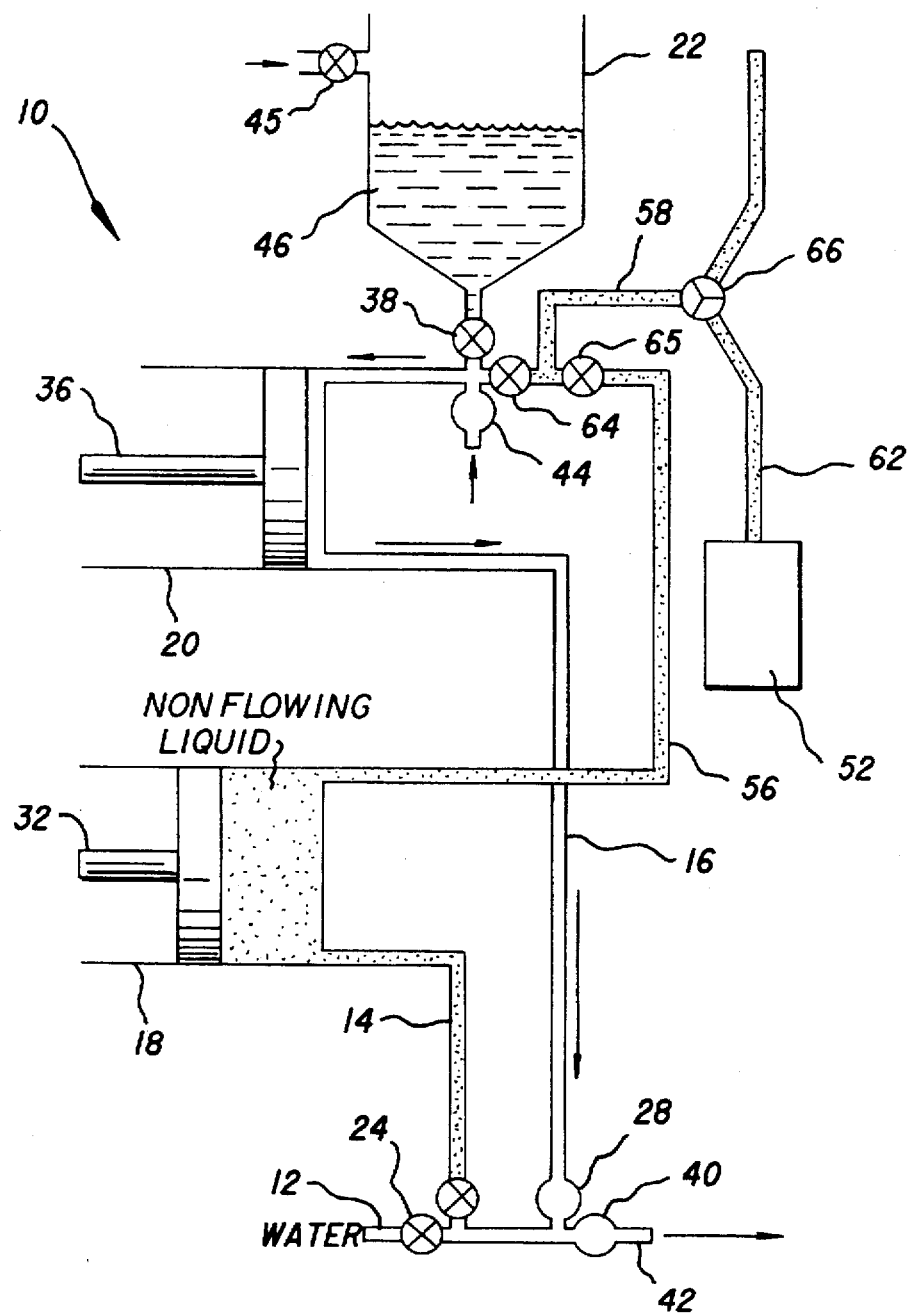

As shown in FIG. 5, valve 44 is now open, allowing air to purge reactant syringe 20 and line 16 to drain line 42. Also in FIG. 5, reactant 46 has been added to vessel 22 either from a supply tank through valve 45 by manual addition.

Figure 6:
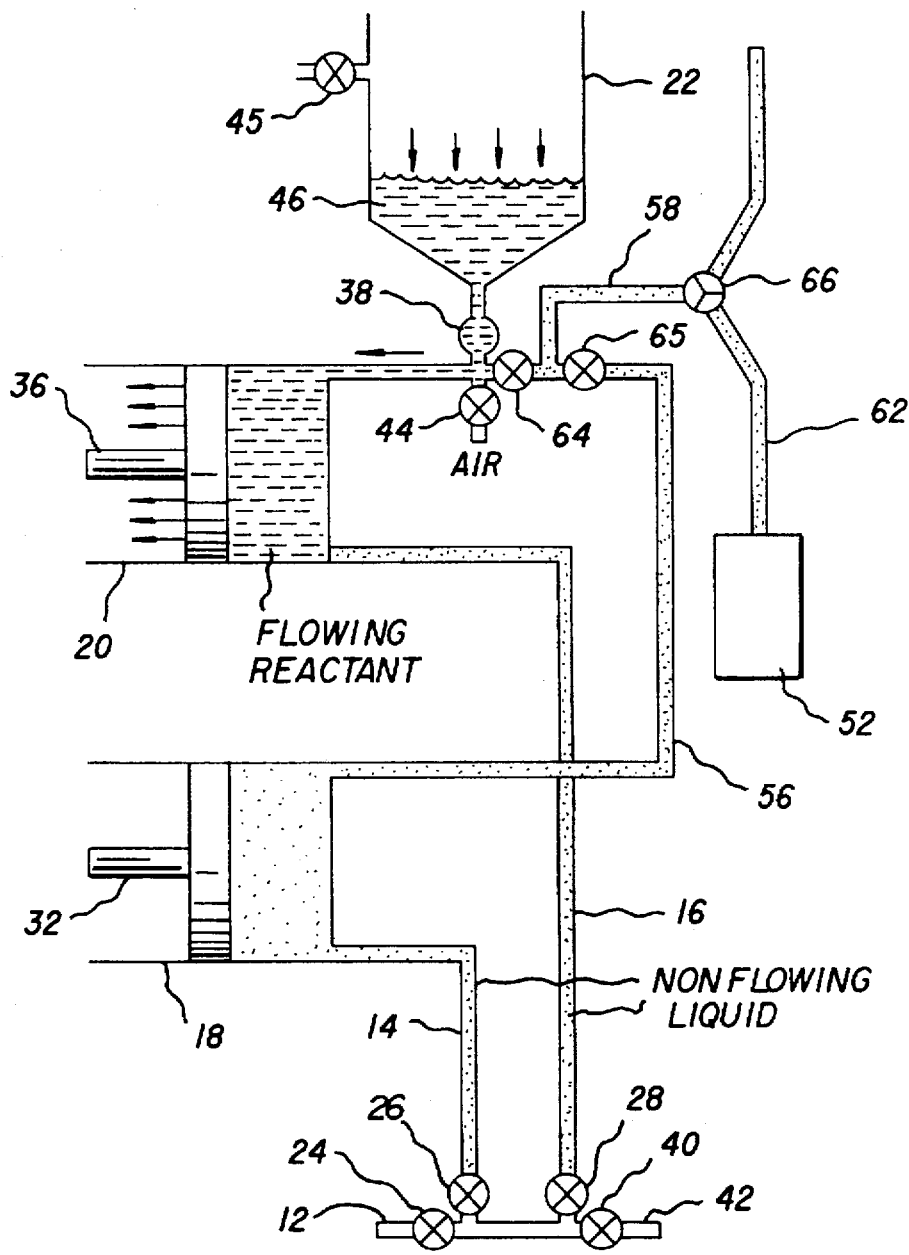

In FIG. 6 is illustrated the filling of reactant syringe 20 by withdrawing piston 36 after opening valve 38 and closing of valve 44. Reactant 46 thereby fills reactant syringe 20.

Figure 7:
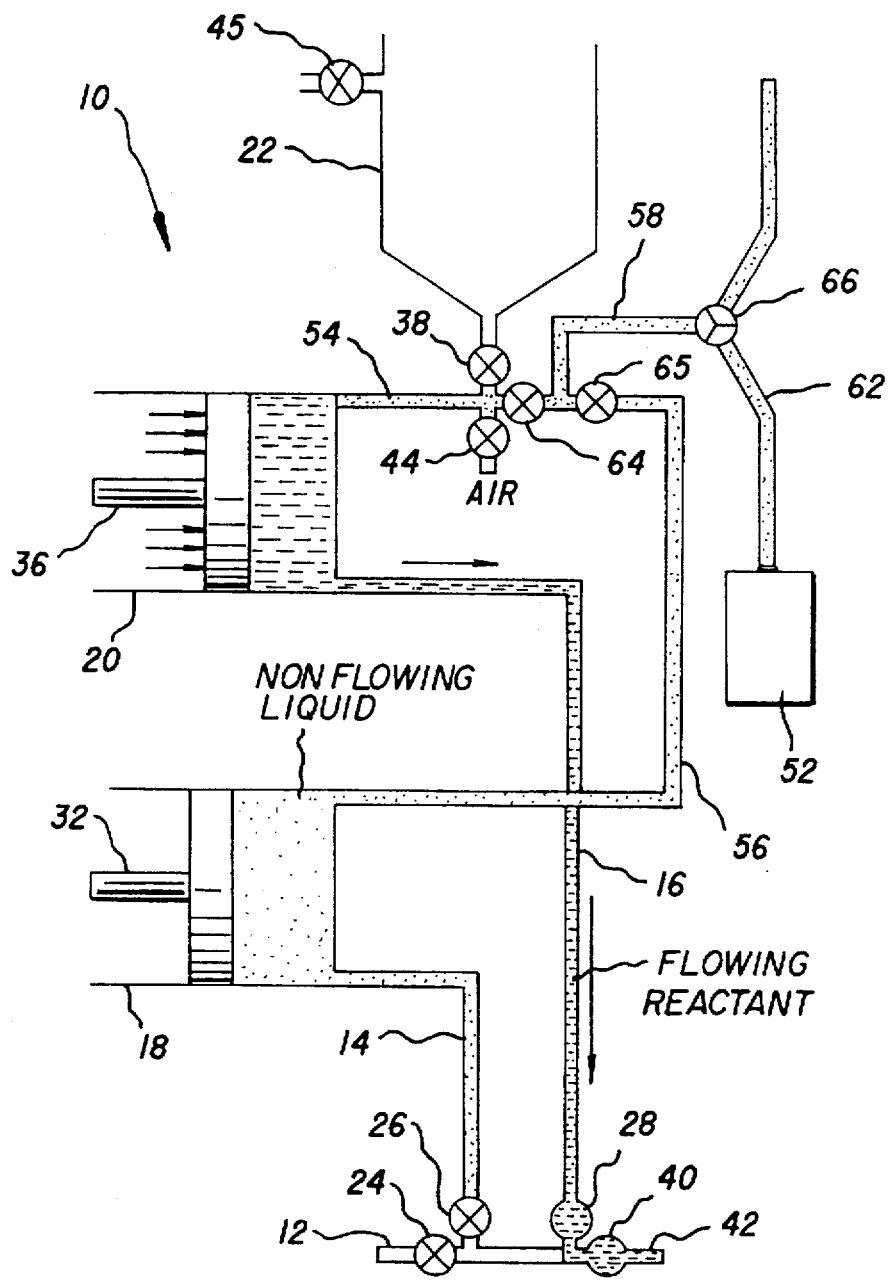
Figure 8:
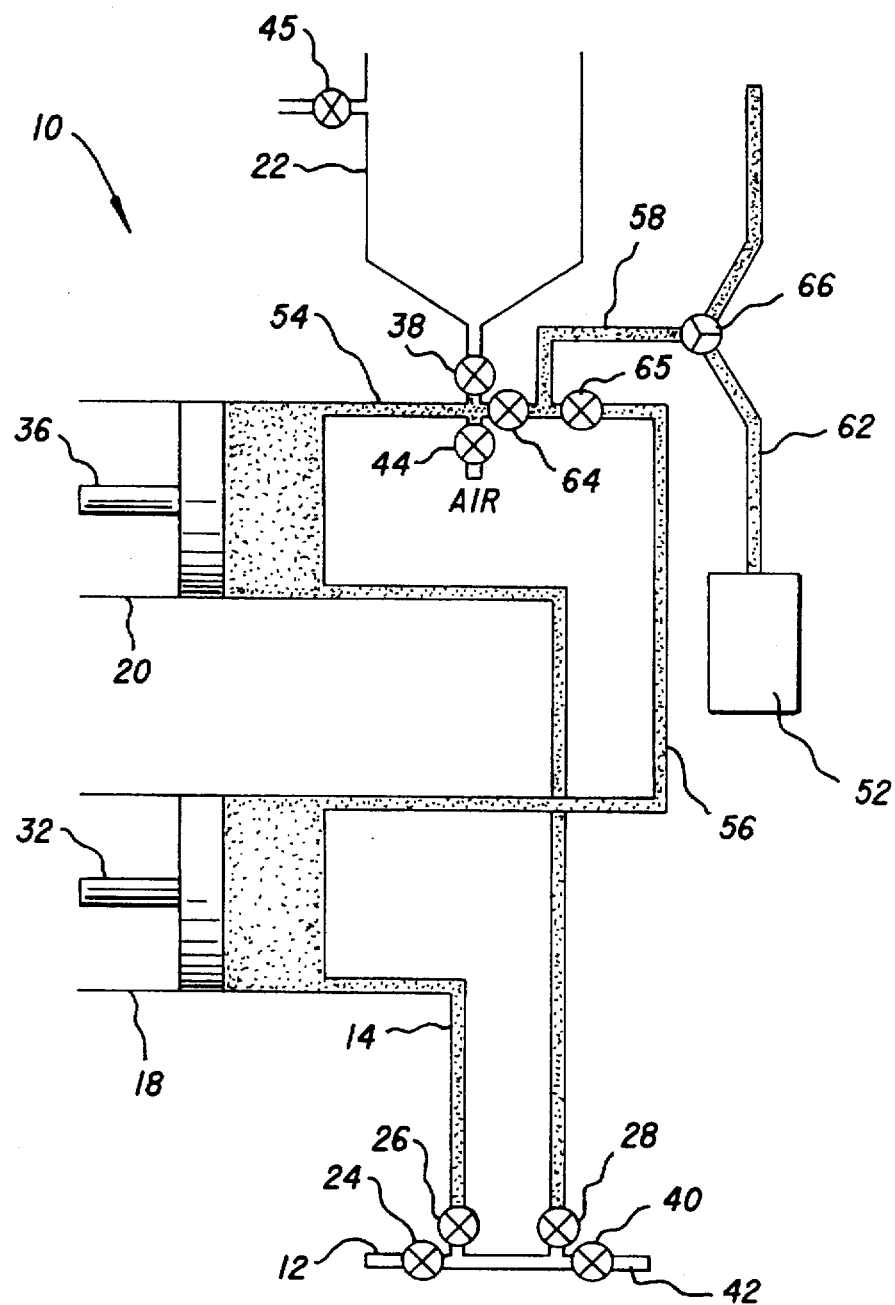

In FIG. 7, piston 36 of reactant syringe 20 is brought forward after valves 28, 40, and 42 have been opened to expel sufficient reactant to fill line 16 with reactant. Then valves 28 and 40 are closed. FIG. 8 illustrates the apparatus of the invention ready to deliver reactants to reactor 52. Reactant is in pipe 54, while water is in pipes 56, 58, and 62.

Figure 9:
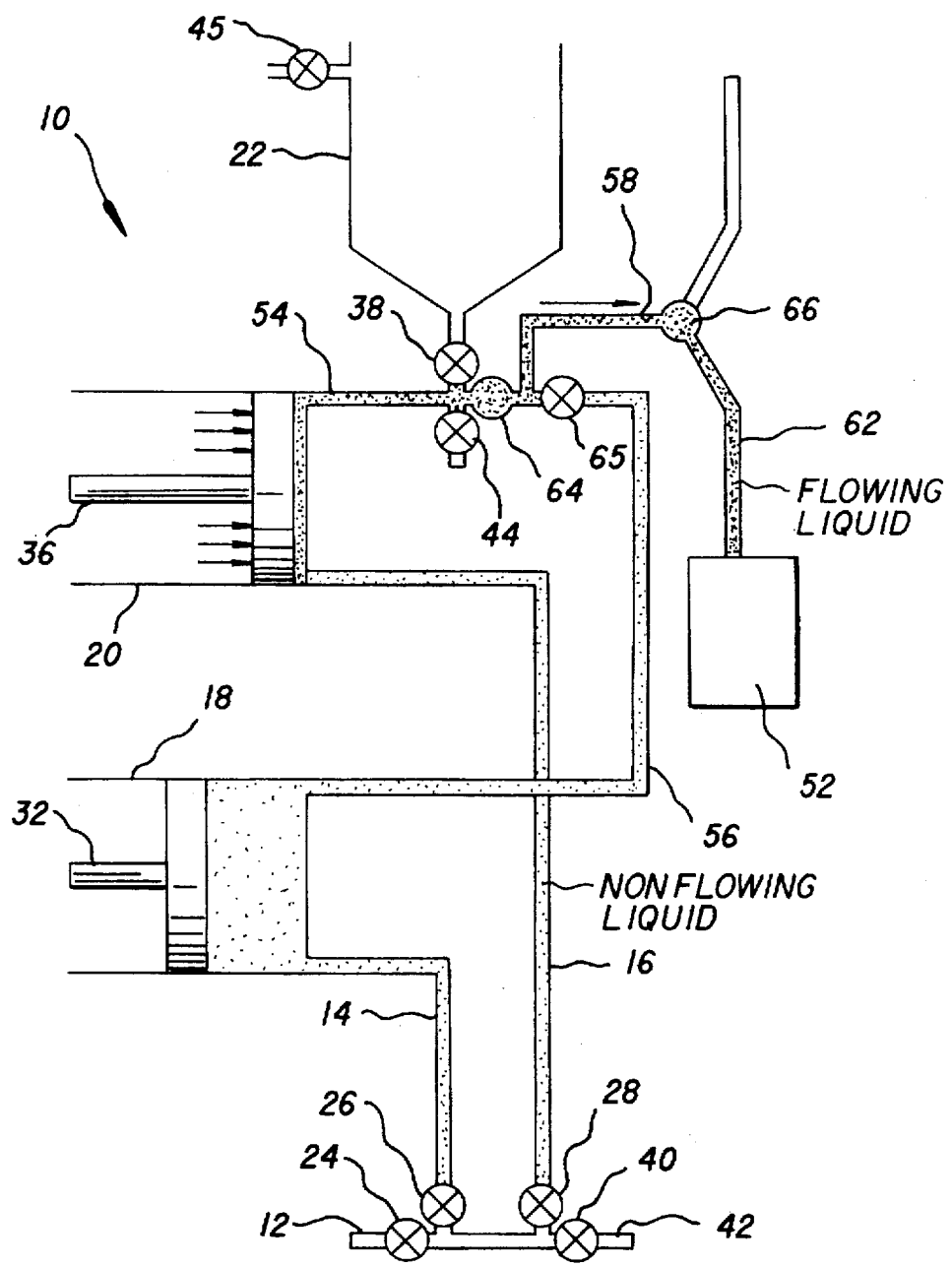

FIG. 9 illustrates reactant delivery wherein piston 36 is brought forward in syringe pump 20 after valve 64 has been opened, and valve 66 has been poitioned for delivery to reactor 52.

Figure 10:
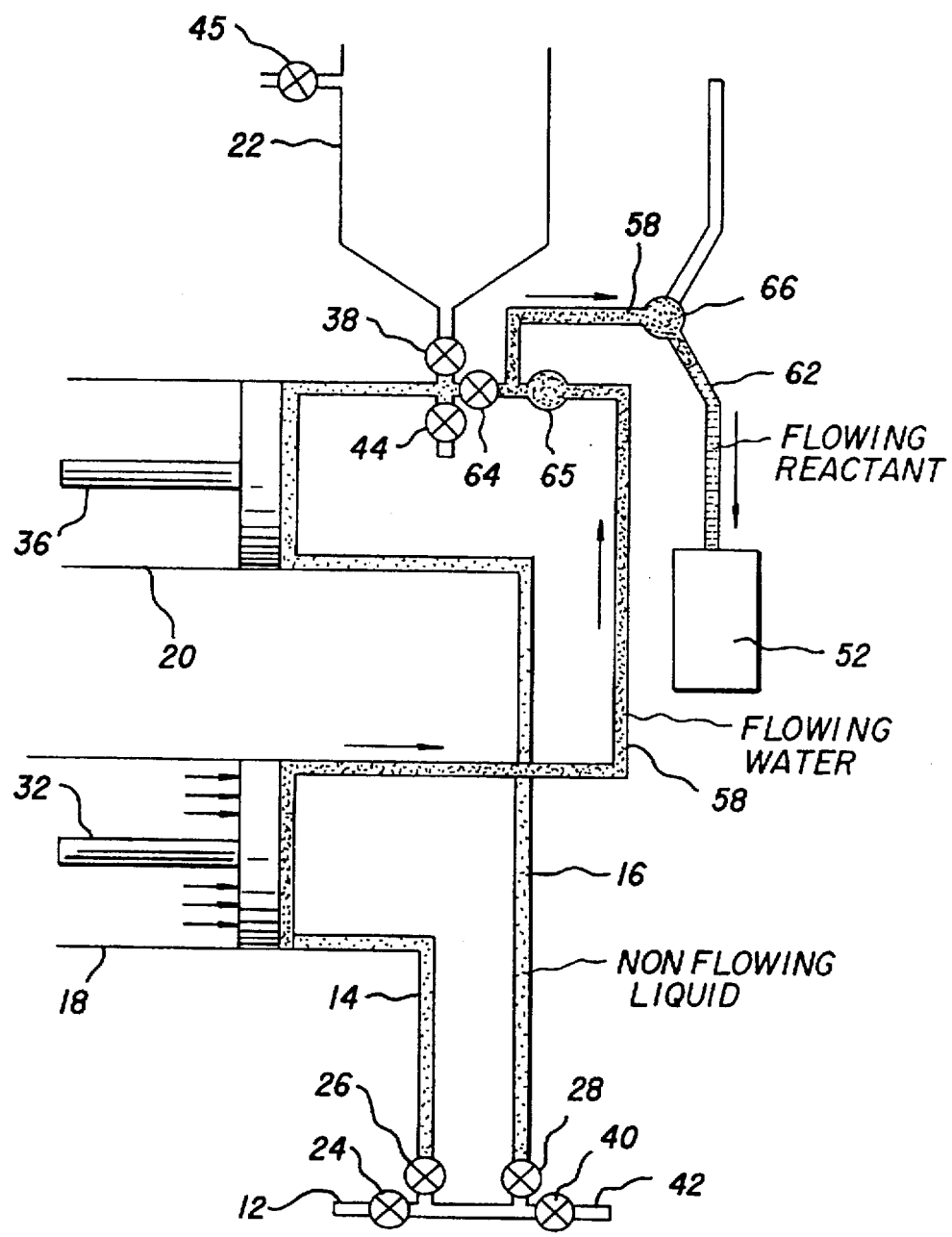

FIG. 10 illustrates that immediately after reactant syringe 20 has completed ejection of reactant by moving of piston 30, piston 32 in water syringe 18 is moved forward to eject water to chase reactant from pipes 58 and 62. Valve 65 is opened to allow the water to enter into pipe 58.

Figure 11:
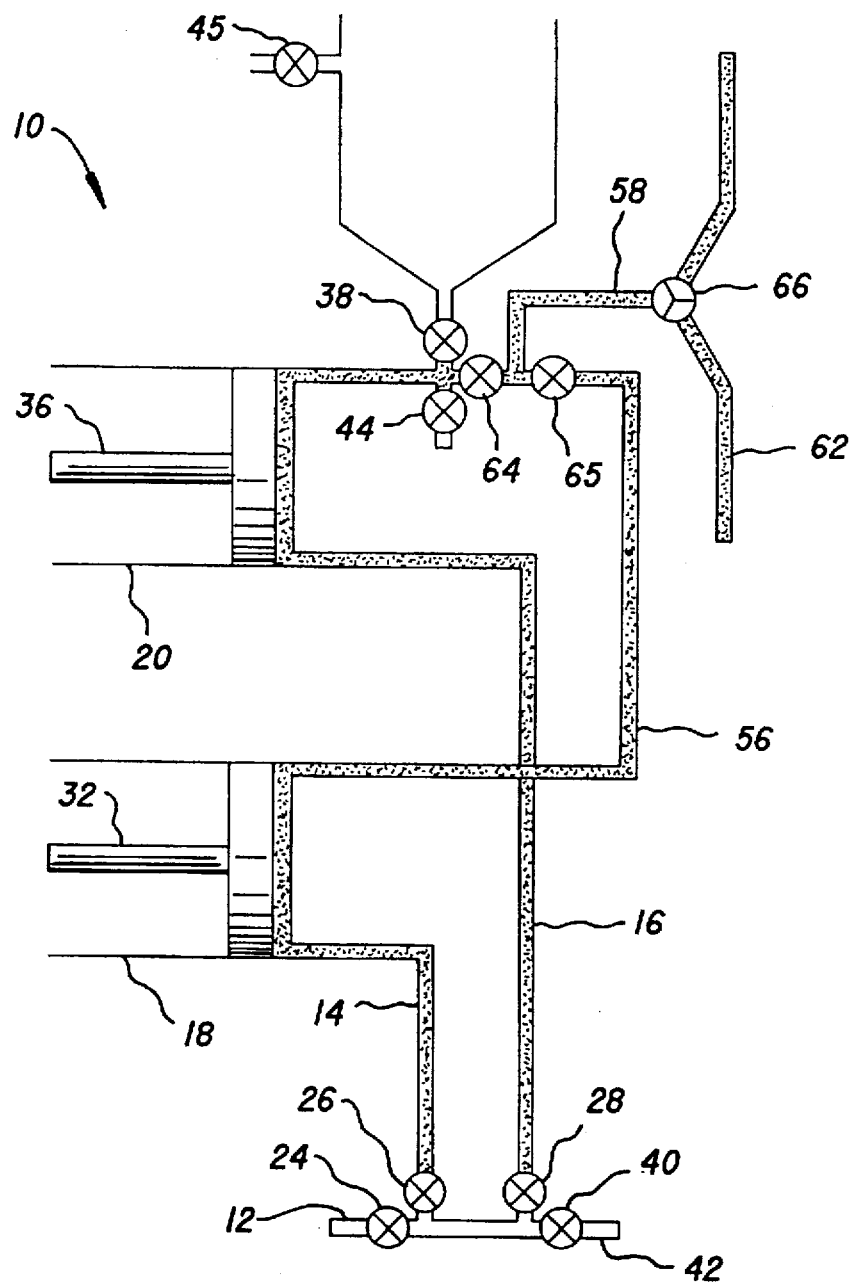

FIG. 11 illustrates the system after delivery. It is apparent from the system illustrated that reactant material of the quantity ejected by piston 36 of reactant syringe 20 was delivered to the reaction vessel in a rapid, precise, and accurate manner. It is noted that valves 65 and 64 are located in very close proximity to pipe 58 insuring that all reactant injected into pipe 58 by syringe pump 20 is pushed by the water from syringe pump 18 into reactor 52.

Figure 12:
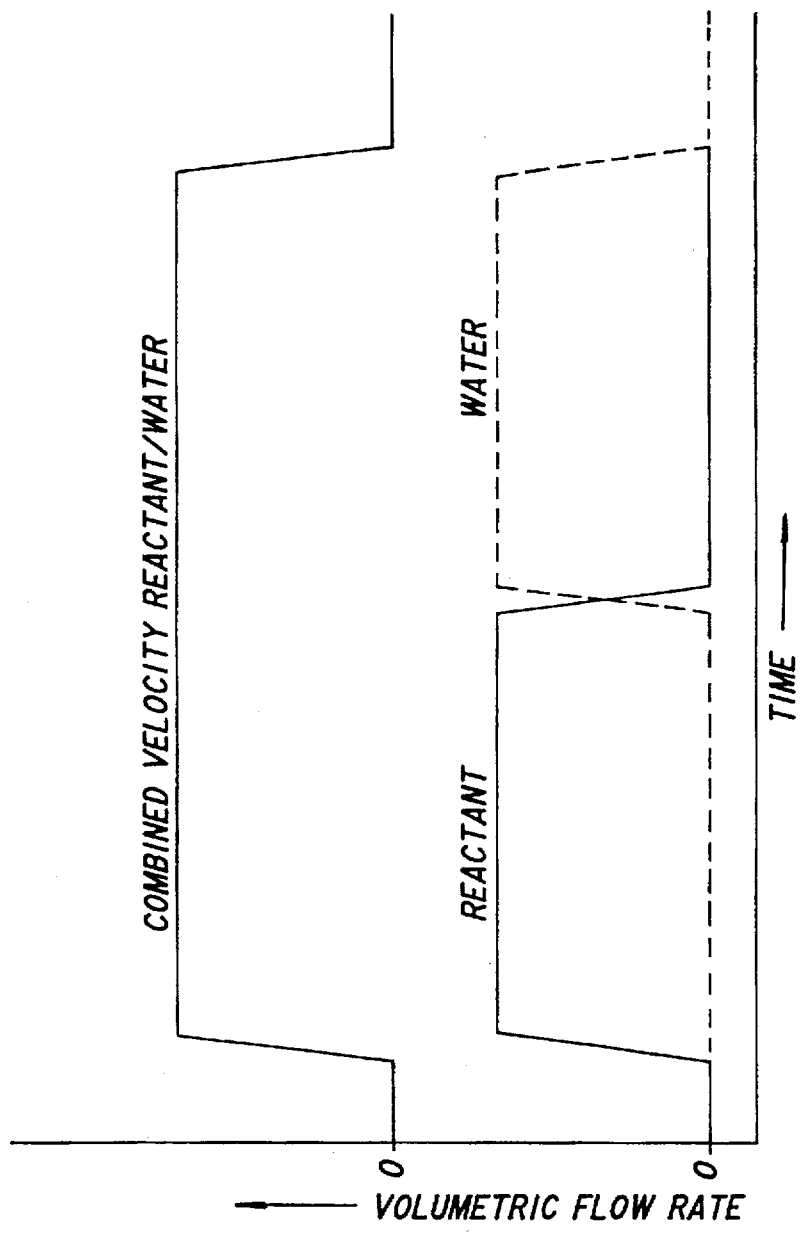
FIG. 12 is a graph which shows that the combined delivery flowrate for reactant and water chase is constant.

With reference to FIG. 12, it is shown that the combined volumetric flowrate of the reactant and water chase remains constant, as the controls are set to accelerate the water piston at the same time that the reactant piston starts to decelerate. This produces a constant volumetric flowrate of delivery. This crossover profile requires that both valves 64 and 65 be open simultaneously during the crossover period.

FIGS. 1-11 depict the basic steps in the operation of the syringe pump system. FIGS. 2, 6, 9, and 10 show the most important steps. For clarity only half of the total system is shown; the other half is identical. One half delivers silver nitrate solution, and the other half delivers alkali metal halide solution, the basic reactants for making a photographic emulsion. FIGS. 2 and 6 show how the water and reactant are drawn into their respective syringes; as can be seen, both water and reactant use the same holding vessel, although separate vessels could be used by varying the piping configuration. Water is added to the jar 22 through appropriate valving from a piped high purity water source; reactant is added to the vessel manually or through valve 45 from a supply vessel (not shown). The water syringe draws in an amount of water equal to approximately 2 ½ times the piping volume to be chased to the reaction vessel (FIG. 2); the reactant syringe draws in an amount of reactant equal to the amount to be delivered to the reaction vessel plus an amount in excess of the volume of the piping between the reactant syringe 20 and the vessel 22 (FIG. 6). Prior to delivery all air is displaced out of the system. The system is now ready for delivery of reactants when it is called for by the process control computer (FIG. 8). When delivery is initiated, the silver nitrate and alkali metal halide solution syringes start simultaneously and accelerate to full speed in a short, precise time period, such as 1/10 second, whereupon they are pushed at a constant formula flowrate into the reaction vessel (FIG. 9); when the formula amount has been delivered, the reactant syringes then decelerate to zero velocity in 1/10 second. As the reactant syringes begin to decelerate, the water chase syringes accelerate in 1/10 second to the same formula flowrate and push the reactants remaining in the piping totally into the remote reaction kettle (FIG. 10). The precisely controlled crossover of reactant to water syringes results in a cumulative constant flow of reactants (FIG. 12). If FIG. 8 is compared to FIG. 11, it can be seen that the only difference is the amount that the syringe pistons have moved; this amount is exactly the amount called for by the formula, and all of this reactant amount has been pushed at a precisely controlled rate in the reaction vessel. There may be other steps in the overall operation which have not been illustrated; these other steps may include flushing, draining, air removal, air testing, leak testing, and temperature compensation.

The apparatus of the invention may be utilized in formation of any silver halide grains. Further, the utilization of this system for delivery of the silver and halide reactants does not exclude the use of other systems for addition of photographically useful materials such as other silver or halide salt solutions, dopants, or pH adjusters to the emulsion forming reaction vessel. As discussed above, two generally matching systems will generally be utilized, one for delivery of halide and the other for silver. However, the system may also be utilized in a single jet system where one of the reactants is already in the reaction vessel, and the other one is delivered by the apparatus of this invention.

The apparatus of the invention is believed to be suitable for any silver halide emulsion grains. Typical of such grains are those disclosed in Section I of *Research Disclosure* 36544 of September 1994.

While this invention has been described specifically with respect to the formation of emulsions, it is useful for other reactant delivery processes. It is particularly desirable for those processes where precise control of reactant delivery must be maintained. While it is illustated with water as the liquid chase material to purge the piping of reactants, it is clear that in other reactant processes, other materials serving as a medium for reaction could be utilized as the chase liquid. The liquid chase material is any lqiuid that serves as a reaction medium for the reactants. Other processes where the apparatus could be used would consist of any other chemical reactions where the final product is dependent on accurate and precise delivery of reactants.

The system of the invention utilizes linear actuators as a means to push the pistons in the syringe pumps. Linear actuators convert rotary motion to linear motion through the interaction of a rotating wall screw and a recirculating ball carrier. The carrier is attached to the linear actuator shaft which becomes the piston rod. The linear actuator is driven by a DC servo feed back motor. A resolver on the motor generates thousands of pulses for every revolution of the motor. The multi-axis linear motion controller reacts to the generation of the rate and quantity of these pulses to provide accurate and precise motion control. Since this is a multi-axis controller, each of the systems syringes can be controlled accurately and precisely relative to each other, as well as in absolute terms.

The means for the detection of the presence of air in the system utilizes the difference in compressibility of gases and liquids. The test for air in the system is done after the syringe pumps and piping are filled with liquid. After closing all system valves, the piston is moved forward a small set amount; if there is no air, a specific pressure will be recorded. If there is even a very small quantity of entrained air, the presssure will be much lower. An alternative means is to record pressure as the piston is moved. If there is no air, the pressure level will increase linearly with position. It will be non-linear if any air is present.

The means for determination of leaks is similar to the air test except that the pressure developed after a specific piston movement is completed is evaluated after a hold period. If the developed pressure holds constant, there are no leaks; if it falls, there are leaks in the system.

Temperature and/or density compensation is accomplished automatically by measuring the reactant temperature just prior to delivery using an RTD. The actual temperature is used to adjust the volumetric flowrate and total delivery amount, in order to assure the correct molar addition rate and amount. In order to accomplish this on-line correction, the syringe must be over prepped, and the delivery completed with a portion of the over prep remaining in the syringe pump.

The invention has been described in detail with particular reference to preferred embodiments thereof, but it will be understood that variations and modifications can be effected within the spirit and scope of the invention.

We claim:

1. A method of liquid delivery comprising delivering reactant material into a pipe, delivering chase material into said pipe to chase said reactant material into a reaction vessel wherein a constant combined volumetric flow rate of reactant and chase material is provided by acceleration of a syringe pump containing said chase material at the same time a reactant syringe pump is decelerated and a valve in said pipe is switched from said reactant material to said chase material.

2. The method of claim 1 wherein said reactant comprises silver nitrate solution or alkali metal halide solution and said chase material comprises water.

3. The method of claim 2 wherein said silver nitrate and metal halide solution are delivered by separate pairs of reactant and chase syringe pumps.

4. The method of claim 1 wherein said chase material is sufficient to push all of said reactant material into said reaction vessel.

5. The method of claim 1 wherein liquid delivery is complete in less than 30 seconds.

6. The apparatus for liquid delivery comprising a syringe pump for reactant delivery into a pipe leading to a reactor vessel, a syringe pump for liquid chase material delivery into said pipe, and a valve in said pipe adapted to switch from said syringe pump for reactant delivery to said syringe pump for chase material delivery, wherein constant combined volumetric flow rate of reactant and chase material is provided by acceleration of the liquid chase syringe pump as the reactant syringe pump decelerates and said valve is switched to said chase syringe pump, and wherein the reactant in the delivery pipe is chased into the reaction vessel by the chase liquid from the syringe pump for chase material after said valve switches.

7. The apparatus of claim 6 wherein said syringe pumps are driven by a linear actuator with DC servo feedback motor and multiaxis linear motion controller.

8. The apparatus of claim 6 wherein said syringe pump is remote from the point of addition into the reactor.

9. The apparatus of claim 6 wherein the apparatus comprises four syringe pumps, two for reactant delivery and two for liquid chase material.

10. The apparatus of claim 6 wherein the apparatus can complete reactant delivery in less than 30 seconds.

11. The apparatus of claim 6 wherein the apparatus can deliver a partial syringe of material.

12. The apparatus of claim 6 further comprising a means for gas removal.

13. The apparatus of claim 6 further comprising a means to blow the apparatus dry with air or other inert gas.

14. The apparatus of claim 6 further comprising a means for leak testing.

15. The apparatus of claim 6 further comprising a means for temperature compensation of the reactant delivery.

16. The apparatus of claim 6 further comprising means for controlling reactant delivery with consideration of reactant density.

17. The apparatus for formation of a silver halide emulsion comprising a syringe pump for silver ion delivery, a pipe for silver ion delivery, a syringe pump for water chase material for said silver ion, a syringe pump for halide ion delivery, a pipe for halide ion delivery, and a syringe pump for delivery of water chase material for said halide ion wherein silver ion in said silver pipe for silver halide delivery is chased into the reaction vessel by water chase material and halide ion in the halide ion delivery pipe is chased into said reaction vessel by said water chase material for said halide ion.

18. The apparatus of claim 17 wherein said silver ion comprises silver nitrate.

19. The apparatus of claim 17 wherein sid halide ion material comprises at least one chloride, bromide, or iodide salt.

* * * * *